United States Patent [19]

Giddings et al.

[11] 4,081,592

[45] Mar. 28, 1978

[54] PROCESS OF POLYMERIZING ACRYLONITRILE COPOLYMERS EMPLOYING TERPINOLENE OR GAMMA TERPINENE AS A CHAIN MODIFIER

[75] Inventors: Brandford E. Giddings, Warrensville Heights; Gerald P. Coffey, Lyndhurst; William M. Giffen, Jr., Aurora; Herbert F. Mazeke, Warrensville Heights, all of Ohio

[73] Assignee: The Standard Oil Company, Cleveland, Ohio

[21] Appl. No.: 769,510

[22] Filed: Feb. 17, 1977

[51] Int. Cl.² .................. C08F 2/00; C08F 26/00; C08F 32/00; C08F 320/44
[52] U.S. Cl. .................. 526/248; 526/89; 526/193; 526/218; 526/228; 526/292; 526/297; 526/308; 526/328; 526/329; 526/330; 526/331; 526/332; 526/342

[58] Field of Search ............ 526/89, 248, 292, 297, 526/328, 329, 308, 330, 331, 332

[56] References Cited

U.S. PATENT DOCUMENTS

| | | | |
|---|---|---|---|
| 3,299,170 | 1/1967 | Gonzenbach | 526/308 |
| 3,401,136 | 9/1968 | Sellers | 526/308 |
| 3,413,246 | 11/1968 | Weyman et al. | 526/308 |
| 3,478,005 | 11/1969 | Wheeler | 526/308 |
| 3,510,461 | 5/1970 | Davis | 526/308 |
| 3,541,186 | 11/1970 | Lee | 526/89 |
| 3,737,418 | 6/1973 | Ruckel | 526/308 |
| 3,761,457 | 9/1973 | Arlt et al. | 526/308 |
| 3,891,609 | 6/1975 | Wolfe et al. | 526/342 |

*Primary Examiner*—Herbert J. Lilling
*Attorney, Agent, or Firm*—John F. Jones; Larry W. Evans

[57] ABSTRACT

Acrylonitrile copolymers having controlled molecular weight are prepared using terpinolene or gamma terpinene as chain length modifier.

6 Claims, No Drawings

PROCESS OF POLYMERIZING ACRYLONITRILE COPOLYMERS EMPLOYING TERPINOLENE OR GAMMA TERPINENE AS A CHAIN MODIFIER

The present invention relates to a polymerization process for preparing acrylonitrile copolymers having controlled molecular weights, and more particularly pertains to such a process which employs terpinolene or gamma terpinene as the molecular weight controller.

The polymers which are most useful in the process of this invention include those produced by copolymerizing a monounsaturated nitrile, such as acrylonitrile, and at least one other monovinyl monomer component copolymerizable with said nitrile.

U.S. Pat. No. 3,541,186 discloses the use of certain terpenes, such as dipentene, as chain transfer agents in the polymerization of nitrile monomers. Terpinolene is said in this patent to be undesirable because it causes color to form in the resulting copolymer when methacrylonitrile and isobutylene are copolymerized.

The other monovinyl monomer component copolymerizable with the monounsaturated nitrile can be one or more of an ester of an olefinically unsaturated carboxylic acid, a vinyl aromatic monomer such as styrene, a vinyl ester such as vinyl acetate, a vinyl ether such as ethyl vinyl ether, and the like.

The olefinically unsaturated nitriles useful in the present invention are the alpha,beta-olefinically unsaturated nitriles having the structure

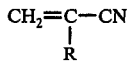

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The esters of olefinically unsaturated carboxylic acids include those having the structure

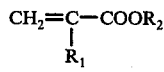

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, the vinyl propionates, the vinyl butyrates, and the like. Most preferred is vinyl acetate.

The vinyl aromatic monomers include styrene, alpha-methyl styrene, the vinyl toluenes, the vinyl xylenes, indene, and the like. Most preferred is styrene.

The olefinically unsaturated nitrile copolymers useful in this invention can be prepared from 1 to 90% by weight of the olefinically unsaturated nitrile and correspondingly from 99 to 10% by weight of the other monovinyl monomer component.

Specific polymerizates which can readily be prepared according to the process of this invention include those prepared by polymerization of 100 parts by weight of (A) at least 50% by weight of at least one nitrile having the structure

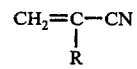

wherein R has the foregoing designation and (B) up to 50% by weight based on the combined weight of (A) and (B) of at least one member selected from the group consisting of (1) an ester having the structure

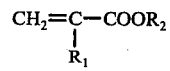

wherein $R_1$ and $R_2$ have the foregoing designations, (2) a vinyl ester selected from the group consisting of methyl vinyl ether, ethyl vinyl ether, the propyl vinyl ethers and the butyl vinyl ethers, (3) vinyl acetate, and (4) styrene. More preferably, component (A) should be present in from about 60 to 90% by weight based on the combined weight of (A) and (B).

The polymerization process of this invention can be carried out by any of the known general techniques of polymerization including bulk, solution, emulsion, and suspension polymerization techniques by batch, continuous or intermittent addition of monomers and other polymerization ingredients. The preferred method is polymerization in an aqueous medium by an emulsion or suspension technique. The polymerization is carried out preferably in an aqueous medium in the presence of an emulsifier or suspending agent and free radical generating polymerization initiator at a temperature of from about 0° to about 100° C in the substantial absence of molecular oxygen.

Emulsifying agents which may be used in the aqueous polymerization process include the soaps such as sodium and potassium myristate, laurate, palmitate, oleate, stearate, resinate, and hydroabietate; alkali metal alkyl and alkylene sulfonates such as sodium and potassium lauryl sulfate, cetyl sulfate, oleyl sulfonate, stearyl sulfonate, sulfonated castor oil, as well as ammonium salts thereof; salts of higher amines such as lauryl amine hydrochloride and stearyl amine hydrobromide; and higher molecular weight materials such as polyvinyl pyrrolidone, sodium polyacrylate, lecithin, methyl cellulose, and the like.

Suspending agents include hydroxyethyl cellulose, gelatin, carboxymethyl cellulose, and the like.

The product of the aqueous emulsion polymerization is usually a latex. The resin may be recovered from the latex by any suitable means such as by coagulation with electrolytes or solvents, by freezing, and the like.

The resin particles from aqueous suspension polymerization can usually be isolated by filtration.

Other materials including plasticizers, stabilizers, lubricants, dyes, pigments, and fillers may be added to the products of our process.

The resinous polymeric products of the process of this invention are thermoplastic materials which can be thermoformed into a wide variety of useful articles in any of the conventional ways employed with known thermoplastic polymeric materials, such as by extrusion, milling molding, drawing, blowing, and the like. The polymeric products of the process of this invention are very useful in the packaging industry and they are particularly useful in the manufacture of bottles, film, sheet, and other types of containers for liquids and solids.

The terpinolene or gamma terpinene polymer modifier should be used in from 0.01 to 10 parts based on 100 parts of monomer.

It is extremely important for resins to be used in the packaging of foods, drugs and cosmetics that no bad odor or taste be transferred from the resin to the product packaged therein. Our discovery that the normally used mercaptan can be replaced with materials which do not contain sulfur is most advantageous from the standpoint of minimizing or even eliminating the last traces of odor or taste in the resin product.

In the following illustrative examples, the amounts of ingredients are expressed in parts by weight unless otherwise indicated.

EXAMPLE 1

A. A suspension terpolymer of acrylonitrile, styrene and methyl acrylate was prepared from the following ingredients:

| Ingredient | Parts |
|---|---|
| acrylonitrile | 75 |
| styrene | 20 |
| methyl acrylate | 5 |
| azobisisobutyronitrile initiator | 0.3 |
| terpinolene | 0.45 |
| hydroxyethyl cellulose | 0.2 |
| distilled water | 200 |

The polymerization was carried out at 85° C in the substantial absence of oxygen with continuous agitation in a suitable polymerization reactor. All of the water, hydroxyethyl cellulose, azobisisobutyronitrile, terpinolene and acrylonitrile, 1 part of styrene and 1 part of methyl acrylate were charged initially to the polymerization reactor. After the polymerization temperature was reached in the reactor, the mixture began to turn milky. About a minute thereafter, the remaining styrene-methyl acrylate monomer was added continuously to the reaction mixture by means of a metering pump. This monomer was metered into the polymerization mixture over a 4½ hour period. At the end of the monomer addition, the reaction was allowed to proceed for another 10 minutes. After cooling, the suspension was filtered and the insoluble resin was washed thoroughly with water and dried. A conversion of 75% by weight of monomers to polymer was obtained. The dried resin was found to be readily processable with a Brabender torque of 950 meter grams at 230° C, 35 rpm and 12 minutes in the Brabender plasticorder. Compression molded test bars of this resin were clear and nearly colorless and were found to have the following ASTM physical properties: flexural strength 12.7 × 10³ psi, flexural modulus 6.04 × 10⁵ psi, tensile strength 8.71 × 10³ psi, and heat-distortion temperature 78° C.

B. A repeat of A of this example except that no terpinolene was used produced a resin having such a high molecular weight that it could not be fused in the Brabender plasticorder at 230° C and 35 rpm.

EXAMPLE 2

The procedure of Example 1A was repeated except that 0.25 part of gamma terpinene was used as chain modifier and 300 parts of water were employed. A conversion of 57% was obtained and the Brabender torque for this resin was 1340 meter grams at 230° C, 35 rpm and 12 minutes after fusion. ASTM physical properties for this resin were flexural strength 9.4 × 10³ psi, flexural modulus 5.17 × 10⁵ psi, tensile strength 6.19 × 10³ psi, and heat-distortion temperature 78° C.

EXAMPLE 3

A. The procedure of Example 2 was repeated using the following recipe:

| Ingredient | Parts |
|---|---|
| acrylonitrile | 75 |
| styrene | 20 |
| methyl methacrylate | 5 |
| azobisisobutyronitrile | 0.3 |
| gamma terpinene | 0.25 |
| hydroxyethyl cellulose | 0.3 |
| distilled water | 333 |

The final polymer was found to be easily processable having a Brabender torque of 1200 meter grams at 230° C and 35 rpm. The polymer was obtained in 80.3% conversion. ASTM testing of test bars of this resin gave the following properties: flexural strength 8.69 × 10³ psi, flexural modulus 5.73 × 10⁵ psi, and heat-distortion temperature 83° C. The barrier properties carried out on films of this resin were as follows: oxygen transmission rate 0.79 and water vapor transmission rate 3.2.

B. A repeat of A of this example using dipentene (1.0 part) gave a resin which is outside the scope of this invention which had a Brabender torque above 3000 meter grams and was too high in molecular weight to be processed.

EXAMPLE 4

The procedure of Example 3 was repeated except that 5 parts of vinyl acetate were used in place of the 5 parts of methyl methacrylate and 0.35 part of gamma terpinene was used. The final resin had a Brabender torque of 1800 meter grams at 230° C and 35 rpm. ASTM physical properties for this resin were as follows: flexural strength 9.15 × 10³ psi, flexural modulus 5.72 × 10⁵ psi, tensile strength 9.26 × 10³ psi, and heat-distortion temperature 87° C. Barrier properties were as follows: oxygen transmission rate 0.64 and water vapor transmission rate 5.56.

EXAMPLE 5

A. emulsion polymerization process was used to prepare an acrylonitrile-methyl acrylate copolymer using the following ingredients:

| Ingredient | Parts |
|---|---|
| water | 225 |
| acrylonitrile | 70 |
| methyl methacrylate | 30 |
| terpinolene | 0.35 |

-continued

| Ingredient | Parts |
| --- | --- |
| benzoyl peroxide | 0.3 |
| Lupersol-11 (catalyst) | 0.01 |
| Gafac RE-610* | 2.0 |

*A mixture of R—O—(CH₂CH₂O—)ₙPO₃M₂ and [R—O—(CH₂CH₂O—)ₙ]₂PO₂M wherein n is a number of from 1 to 40, R is an alkyl or alkaryl group and preferably a nonyl phenyl group, and M is hydrogen, ammonia or an alkali metal, which composition is sold by GAF Corporation.

The water-emulsifier solution was placed in a polymerization reactor and was then purged with nitrogen with stirring and heating to 70° C at this point 20% by weight of the acrylonitrile-methyl methacrylate-terpinolene mixture which was added along with all of the catalyst. After total solids indicated some conversion, the remaining 80% by weight of the acrylonitrile-methyl methacrylate-terpinolene mixture was added continuously over a 4-hour period. The resulting resin which was isolated by coagulation with alum, washed and dried was found to have a Brabender torque at 230° C and 35 rpm of 1720 meter grams at 12 minutes after fusion.

B. A repeat of A of this example without any terpinolene gave a resin which was not readily processable having a Brabender torque of 2750 meter grams at 230° C, 35 rpm and 12 minutes after fusion.

EXAMPLE 6

The procedure of Example 5A was repeated except that the monomers used were 75 parts of styrene and 25 parts of acrylonitrile. The final resin was found to be readily processable having a Brabender torque of 1100 meter grams at 230° C, 35 rpm and after 12 minutes.

EXAMPLE 7

A suspension procedure was employed to prepare an acrylonitrile-styrene copolymer from the following ingredients:

| Ingredient | Parts |
| --- | --- |
| water | 200 |
| hydroxyethyl cellulose | 0.2 |
| K₂SO₄ | 0.2 |
| acrylonitrile | 75 |
| styrene | 25 |
| gamma terpinene | 0.35 |
| azobisisobutyronitrile (AIBN) | 0.3 |

The water, hydroxyethyl cellulose, K₂SO₄, acrylonitrile, gamma terpinene and 2 parts of styrene were added to the polymerization reactor and brought to 60° C with nitrogen purging and stirring. After ½ hour, the AIBN was added and 10 minutes later the remainder of the styrene was added continuously over a 3-hour period. One-half of the styrene was added during the first hour and the remainder was added during the next 2 hours. The final resin was found to have a Brabender torque of 800 meter grams at 230° C, 35 rpm and in 12 minutes.

EXAMPLE 8

A. Example 1 of U.S. Pat. No. 3,541,186 was repeated to produce a copolymer of methacrylonitrile and isobutylene with dipentene as chain-transfer agent. This resin, which is outside the scope of the present invention, was placed in the Brabender plasticorder at 210° C and 35 rpm and was found to have a light transmission of only 15% after 10 minutes and a yellowness index of 108.3 after only 4 minutes in the Brabender.

B. A polymer prepared by the procedure of Example 1A of this invention was found to have a light transmission of 85.2% after 13 minutes in the Brabender plasticorder at 210° C and 35 rpm and a yellowness index of 15.8 after 4 minutes in the Brabender.

We claim:

1. The process comprising polymerizing in an aqueous medium in the presence of a free-radical generating polymerization initiator in the substantial absence of molecular oxygen 100 parts by weight of monomers consisting essentially of
   (A) from 1 to 90% by weight of at least one nitrile having the structure

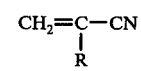

wherein R is hydrogen, a lower alkyl group having from 1 to 4 carbon atoms, or a halogen, and
   (B) from 99 to 10% by weight of at least one member selected from the group consisting of
   (1) an ester having the structure

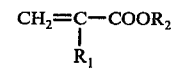

wherein R₁ is hydrogen, an alkyl group having from 1 to 4 carbon atoms, or a halogen, and R₂ is an alkyl group having from 1 to 6 carbon atoms,
   (2) a vinyl ether selected from the group consisting of methyl vinyl ether, ethyl vinyl ether, the propyl vinyl ethers, and the butyl vinyl ethers,
   (3) vinyl acetate, and
   (4) styrene, in the presence of at least one member selected from the group consisting of terpinolene and gamma terpinene.

2. The process of claim 1 carried out in aqueous emulsion.

3. The process of claim 1 carried out in aqueous suspension.

4. The process of claim 1 wherein there is employed from 0.01 to 10 parts per 100 parts of monomer of terpinolene or gamma terpinene.

5. The process of claim 4 wherein terpinolene is used alone.

6. The process of claim 4 wherein gamma terpinene is used alone.

* * * * *